(12) United States Patent
Wolter

(10) Patent No.: US 7,867,420 B2
(45) Date of Patent: Jan. 11, 2011

(54) PROCESS FOR THE PRODUCTION OF A CONTAINER OF THERMOPLASTIC MATERIAL BY EXTRUSION BLOW MOLDING AND A CONNECTION ELEMENT FOR USE IN SUCH A PROCESS

(75) Inventor: Gerd Wolter, Konigswinter (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 12/127,789

(22) Filed: May 27, 2008

(65) Prior Publication Data

US 2008/0290564 A1 Nov. 27, 2008

Related U.S. Application Data

(60) Provisional application No. 60/940,237, filed on May 25, 2007.

(51) Int. Cl.
*B28B 1/48* (2006.01)

(52) U.S. Cl. .............. 264/154; 264/163; 29/432

(58) Field of Classification Search .......... 264/531, 264/540, 516, 545, 534, 163, 154, 155, 138; 29/527.1, 527.3, 432; 425/527, 531; *B29C 49/50*
See application file for complete search history.

(56) References Cited

U.S. PATENT DOCUMENTS

| | | | | |
|---|---|---|---|---|
| 5,078,948 A | * | 1/1992 | Troutman et al. | .......... 264/526 |
| 5,103,865 A | * | 4/1992 | Hyde | .......... 137/588 |
| 5,447,400 A | * | 9/1995 | Seymour | .......... 411/29 |
| 5,534,218 A | | 7/1996 | Daubenbachel et al. | |
| 2002/0063129 A1 | | 5/2002 | Potter | |
| 2004/0200846 A1 | * | 10/2004 | Miyajima et al. | .......... 220/562 |
| 2008/0078761 A1 | * | 4/2008 | Borchert et al. | .......... 220/4.13 |

FOREIGN PATENT DOCUMENTS

| | | |
|---|---|---|
| DE | 3042926 | 6/1982 |
| DE | 10237187 | 7/2003 |
| EP | 0595158 | 5/1994 |
| EP | 1211196 | 6/2002 |
| EP | 1894702 | 3/2008 |

OTHER PUBLICATIONS

English language translation of International Preliminary Report on Patentability dated Dec. 17, 2009 issued in related International Patent Application No. PCT/EP2008/003608.

* cited by examiner

*Primary Examiner*—Khanh Nguyen
*Assistant Examiner*—Vishal I Patel
(74) *Attorney, Agent, or Firm*—Grossman Tucker Perreault & Pfleger, PLLC

(57) ABSTRACT

A process for the production of a container of thermoplastic material by extrusion blow molding is provided, in which during shaping of the container within a multi-part tool, the container is provided with at least one connection element (3) which passes through the wall of the container. The connection element (3) according to the invention, is of a two-part structure, wherein a part is in the form of a removal cutting element (11). The cutting element (11) serves as a penetration tip for piercing the wall of the container while still in the plastic condition.

12 Claims, 3 Drawing Sheets

PROCESS FOR THE PRODUCTION OF A CONTAINER OF THERMOPLASTIC MATERIAL BY EXTRUSION BLOW MOLDING AND A CONNECTION ELEMENT FOR USE IN SUCH A PROCESS

CROSS-REFERENCE TO RELATED APPLICATIONS

This application claims the benefit of U.S. Provisional Application 60/940,237 filed May 25, 2007.

FIELD

The invention concerns a process for the production of a container of thermoplastic material by extrusion blow molding and a connection element for use in such a process.

The invention concerns, in particular, a process for the production of a fuel tank of thermoplastic material and a connection element for such a fuel tank.

BACKGROUND

Fuel tanks of thermoplastic material are basically to be impermeable to hydrocarbons. They are usually produced from multi-layer co-extrudates containing barrier layers for hydrocarbons. The plastic materials used for the production of plastic fuel tanks, for example polyethylene, are basically not diffusion-tight in relation to hydrocarbons. In addition those plastic materials have a tendency to swell up in the presence of fuel. For that reason, the known fuel tanks of plastic material are provided with a multi-layer wall in which an EVOH layer is embedded as a hydrocarbons barrier. In that respect, the lack of diffusion-tight integrity of the base material used does not represent any problem.

Usually, however, fuel tanks are provided with installation fitments and they have air intake and venting lines as well as electrical connections. To produce means for passing them through the tank wall, it is known for the finished container to be provided with cut-out openings into which connection means, valves or the like are fitted. The valves, valve covers and nipples are welded to the outside wall of the container in such a way as to cover the respective opening. Such connecting locations on a fuel tank represent potential leakage points. The term leakage does not mean the loss of liquid in the true sense, but rather that means diffusion leakage or diffusion losses in the region of seam locations and/or welds without involving additional barrier measures. In order to avoid leakage paths at connections on the fuel tank, it is known for connection means and valves to be produced in the form of complicated and expensive two-component structural parts, in which case those structural parts usually have at least one part comprising a plastic material which is weldable to the tank wall. Functional parts on such elements in contrast usually consist of plastic materials which do not swell up in the presence of fuel. Those plastic materials generally cannot be welded to the plastic materials used for the tank wall.

A process for the production of a fuel tank of thermoplastic material and such a fuel tank having connection elements for hoses or the like is known for example from EP 1 211 196. EP 1 211 196 A1 describes a double-shell fuel tank of thermoplastic material with a barrier layer for hydrocarbons, which is embedded in the container wall, the shell portions which are assembled to constitute the container having been produced by thermoforming. In order to ensure simple mounting of connection elements while maintaining a high level of permeation sealing integrity in relation to hydrocarbons, EP 1 211 196 A1 proposes a two-part connection element or two-part fitting which includes at least an outer component and an inner component, wherein the outer component is welded to the outer wall of the container and the inner component at least partially passes through the outer component with displacement and intermediate positioning of the container wall. That arrangement has the advantage that the container wall is so displaced and enclosed between the component parts that the displaced material serves as a sealing means for the passage through the container wall.

Such a passage through the container wall can be comparatively easily produced in the operation of thermoforming the half-shell portions of the container, but such a connection is more difficult to implement when producing a fuel tank by extrusion blow molding.

Therefore, the object of the invention is to provide a process for the production of a container, in particular a fuel tank of thermoplastic material, with which it is possible for connection elements to be provided on the container during the production thereof using the simplest possible means. In that respect, the invention seeks to provide that as far as possible leakage paths for hydrocarbons in the wall of the container are avoided or are restricted to a minimum.

SUMMARY

In accordance with the invention, there is provided a process for the production of a container of thermoplastic material by extrusion blow molding, in which during shaping of the container within a multi-part tool, the container is provided with at least one connection element which passes through the wall of the container, wherein the wall of the container is pierced in the still plasticized condition with a part of the connection element in such a way that the connection element entails a connection involving a flow of material with the container wall at least in partial regions, wherein the connection element is provided with a penetration tip and the connection element upon penetration of the container wall is pushed into a die which is provided in the tool and which is or becomes arranged on the side of the container wall that is remote from the connection element.

The penetration tip and the die can be of such a configuration in that case that the wall of the container is opened in the region in question, in which penetration occurs, in such a way that substantially no or only a very slight degree of protuberance of the container wall is produced. If the diameter of the die is only immaterially larger than that of the penetration tip of the connection element, then the opening which is pierced by the connection element in the wall of the container is substantially stamped out. If, at its end which is to be passed through the wall of the container, the connection element is of a given configuration for receiving connection components such as tubes or hoses, that ensures that the penetration end of the connection element projects freely out of the wall of the container. It is self-evident to the man skilled in the art that some slight post-processing may possibly be required for that purpose upon or after removal of the container from the tool.

In the process according to the invention, the connection element is used as a lost shaping punch which pierces the wall of the container from one side. The connection element itself is used in that case as a means for piercing the container wall and remains as a lost shaping punch in the container wall. The tool serves in that case as a die or receiving means or as a support for the part of the connection element, which is to be pushed through the wall of the fuel tank. The expression "piercing the container wall" in accordance with the invention is to be interpreted as meaning that the material in the peripheral region of the opening produced in that way in the wall of the container is to experience as little deformation as possible in the sense of forming a protuberance.

The process, according to the invention, desirably includes the extrusion of two preforms in web form, each web thereof forming a container shell portion. The webs are shaped in a three-part molding tool comprising outer molds and a central mold, wherein the central mold has movable or slidable component holders, by means of which components can be placed at the inside wall of the container in the operation of shaping out the container in the mold. In accordance with the invention, it is provided that the connection element is in that way caused to pass through the container wall from the inside outwardly.

Preferably, when penetrating through the container wall, the connection element is pushed into a die which is provided in the tool and which is arranged on the side of the container wall, that is remote from the connection element. Such a die can be easily formed by an opening in the tool. As an alternative to such an opening in the tool, it is possible to fit into the tool an insert portion which remains at the wall of the container after the container is finished.

Desirably, the connection element used is a nipple provided with a peripherally extending flange for welding to the container wall. Welding to the container wall takes place on the side of the peripherally extending flange, that is, towards the container wall. In addition, a weld is made with that part of the periphery of the connection element which passes through the container wall.

Alternatively, the connection element and a functional component which is to be provided, for example, at the inside of the container can be integrally connected together so that, for example, the connection element has a part for passing through the container wall with a flange-like collar formed thereon, while on the other hand it integrally has, for example, a valve housing, a beading-out container or any other plastic component part.

In addition, the free end of the connection element does not necessarily have to be in the form of a nipple, but rather it can also be in the form of a plug connector, a plug coupling means or the like.

The penetration tip can be, for example, a cutting element of a sleeve shape, which is fitted removably by means of a latching or snap-action connection onto a complementary latching profile configuration of the connection element. The removable penetration tip fitted onto the connection element protects the connection element from becoming covered or clogged by the displaced plastic material. Particularly if the connection element passes through the container wall from the inside outwardly, the penetration tip can be easily removed after the container is finished.

It can be provided, for example, that the cutting element is used a plurality of times.

The object of the invention is further attained by a connection element for use in relation to a process according to the invention, which is distinguished in that it is in the form of a tubular penetration element with a peripherally extending collar for welding to the container wall, wherein a part of the connection element is provided with a peripherally extending cutting edge. Preferably the connection element is of a two-part structure, wherein a part of the connection element is in the form of a removable cutting element.

Such a cutting element can be, for example, of a sleeve-shaped configuration, in which case it desirably surrounds the insertion side of the connection element, which is provided for piercing the wall.

If the connection element is, for example, in the form of a conventional nipple with ends which are provided for hoses or lines to be crimped thereon and which usually have what is referred to as a Christmas tree profile, it is particularly advantageous if the cutting element surrounds the profiled spigot in question of the connection element or the nipple in such a way that the connection profile thereof is not fused to or covered with thermoplastic material.

Desirably, the cutting element is latched to the connection element.

In a variant of the connection element, it is in the form of a nipple with at least one outer holding profile, the holding profile co-operating in positively locking relationship with the cutting element. The holding profile for that purpose can have, for example, a peripherally extending latching recess cooperating with one or more latching hooks or latching projections on the cutting element.

The cutting element is desirably in the form of a substantially cylindrical sleeve having a peripherally extending cutting edge which leads in the position of installation. The cutting edge is desirably in the form of a wavy line so that at its leading end the cutting element is in the form of a cutter crown.

In an alternative variant of the connection element, according to the invention, the cutting element in the longitudinal direction has at least one inner subdivision means which provides for the formation of at least one melt material chamber which is at the front in the cutting direction and at least one melt material chamber which is at the rear in the cutting direction. The plasticized thermoplastic material which is displaced when the wall is pierced is firstly caught in the front melt material chamber. The material is possibly also displaced into the melt material chamber which is at the rear in the cutting direction. For that purpose, it is desirably provided that the melt material chambers communicate with each other by way of at least one melt material passage.

DESCRIPTION OF THE DRAWINGS

Advantageous configurations of the invention are described hereinafter by means of an embodiment illustrated in the drawing in which.

DETAILED DESCRIPTION

Figure 1:
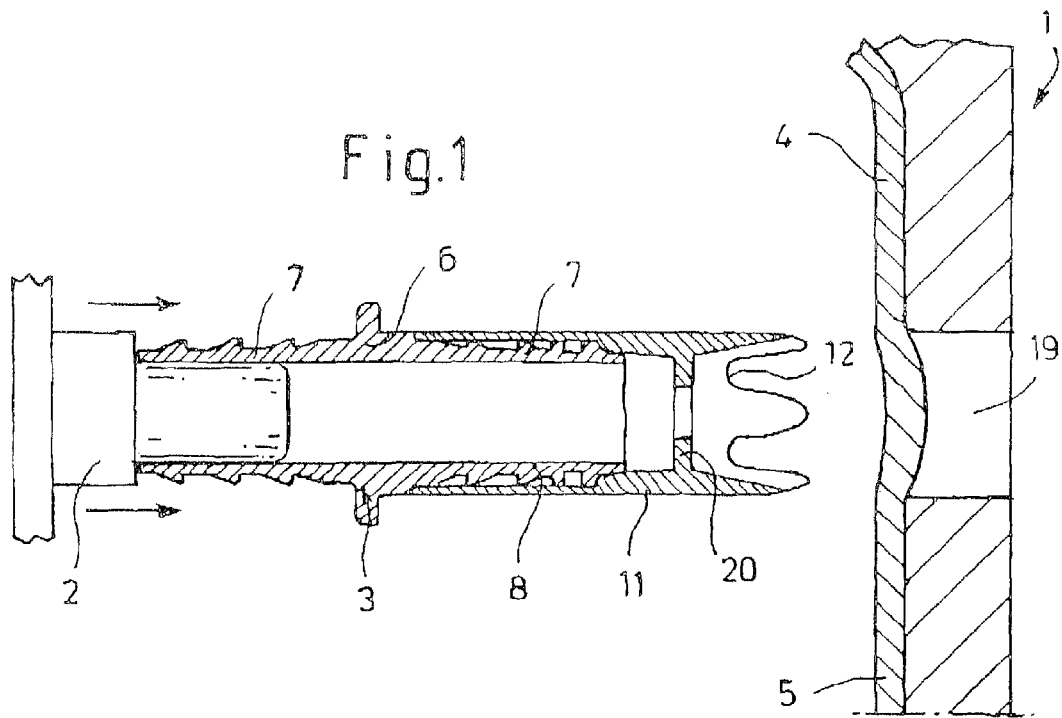
FIG. 1 shows a diagrammatic view of a first variant of a connection element fitted onto a component holder prior to piercing of the container wall therewith.

FIG. 1 diagrammatically shows only a part of a wall of a blow molding tool 1. The complete blow molding tool as well as the associated extruders and removal apparatuses and the like are not shown for reasons of simplicity.

The blow molding tool which is provided for production of the container in accordance with the invention comprises two outer molds and a central mold, wherein the individual parts of the blow molding tool are mounted in the usual fashion on mold mounting plates which are displaceable within a closing support frame structure. The outer molds are displaceable away from and towards each to provide an opening and closing movement of the blow molding tool. The central mold is displaceable transversely with respect to the opening and closing movement of the outer molds. The central mold includes pneumatically displaceable or slidable component holders with which installation fitments can be placed in the container to be produced. The container, according to the invention, is in the form of a fuel tank of thermoplastic material, which is extruded in a multi-layer configuration.

Figure 2:
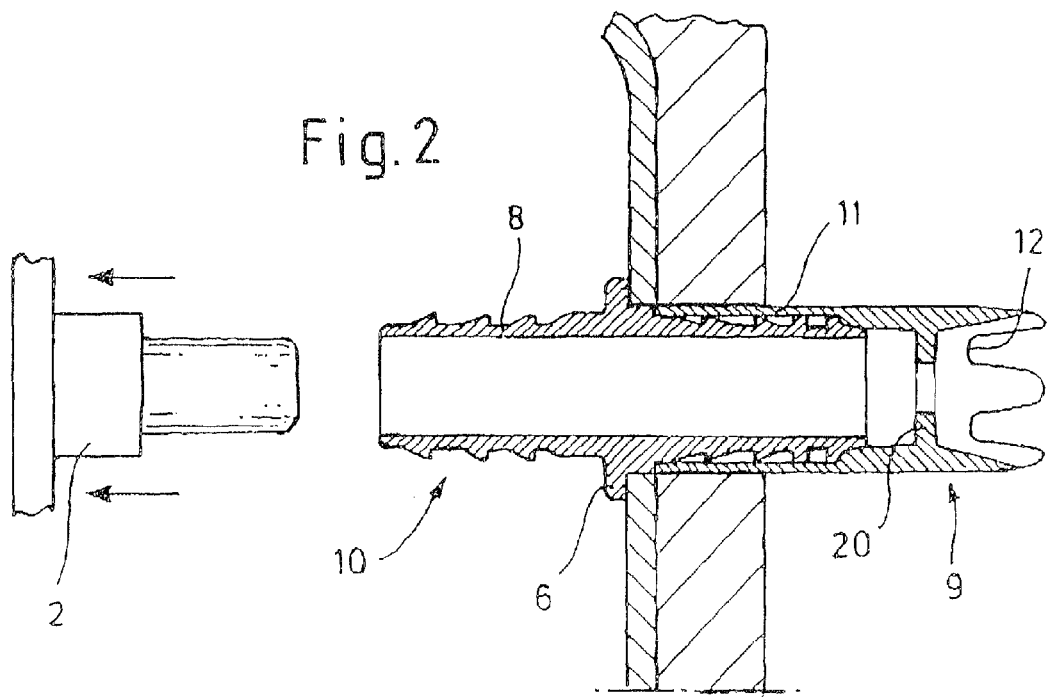
FIG. 2 shows the operation of piercing the container wall by means of the connection element according to the invention.

The process includes the extrusion of preforms in web form from extrusion heads, wherein the preforms are respectively cut to length between the outer molds and the central mold. The outer molds are closed with respect to the central mold. The preforms are pressed or drawn into the cavity portions of the tool, which are formed by the outer molds, by means of pressure gas actuation and/or by means of an externally applied vacuum. In a further step, for example, the connection element 3 which is placed on the component holder 2 is displaced in a direction towards an outer mold (blow molding tool 1) so that the connection element 3 pierces the wall 4 of the preform 5. Then, for example, the component holder 2 shown in FIG. 2 is drawn into the central mold (not shown). The outer molds are moved away from each other and the central mold is displaced transversely to the opening and closing movement between the outer molds so that the outer molds can close again and the preforms which in the meantime form respective half-shell portions can join together to form a closed container.

As already mentioned in the opening part of this specification, the connection element 3 can be in the form of a connection nipple which, on each side of a peripherally extending collar 6, forms a respective spigot 8 provided with a Christmas tree profile 7. In relation to the wall 4 of the perform, the connection element 3 has an end 9 which leads in the insertion direction and an end 10 which is at the rear in the insertion direction. In the variant of the connection element 3 shown in FIGS. 1 through 3, fitted onto the leading end 9 is a hollow cutting element 11 of a sleeve shape, which has a front peripherally extending cutting edge 12. The cutting edge 12 is in the configuration of a wavy line and has a crown-shaped profile, thereby simplifying the operation of piercing the wall 4 of the preform 5. The cutting edge 12 does not necessarily have to be of a configuration in the form of a wavy line, but rather it can also involve the contour of the cutting element shown in FIG. 4. At the end of the cutting element 11 remote from the cutting edge 12, it is provided with inwardly protruding, resilient latching projections 13 which snap into a peripherally extending latching recess 14 at the periphery of the spigot 8. The latching projections 13 can each be provided on latching springs of the cutting element, which can be formed for example by longitudinal slots of a suitable configuration therein.

In addition, a peripherally extending abutment 15 for the cutting element 11 is provided on the spigot 8 of the connection element 3 at its leading end 9.

In the region of the peripherally extending cutting edge 12, the cutting element forms a first melt material chamber 16 which leads in the insertion direction. Disposed therebehind in the insertion direction is a second melt material chamber 17. The melt material chambers 16, 17 are communicated with each other through a melt material passage 18.

Provided in the wall of the blow molding tool 1 is an opening 19 forming a die which in its diameter corresponds to the diameter of the cutting element 11. As can be seen from joint consideration of FIGS. 1 through 3, the connection element 3 which is fitted onto the component holder 2 is pushed by means of the component holder 2 into the wall 4 of the preform 5, in which case the plastic material which in that situation is penetrated and displaced by the cutting element 11 is urged into the opening 19. In part, the material flows into the first melt material chamber 16 and possibly through the melt material passage 18 into the second melt material chamber 17.

FIG. 2 shows the component holder in the retracted condition and the connection element which has completely penetrated the wall 4 of the preform 5, in which case the peripherally extending collar 6 of the connection element 3 bears over the full surface area involved against the wall 4 and is welded to the wall of the preform 5, the wall still being in a plastic condition.

Figure 3:
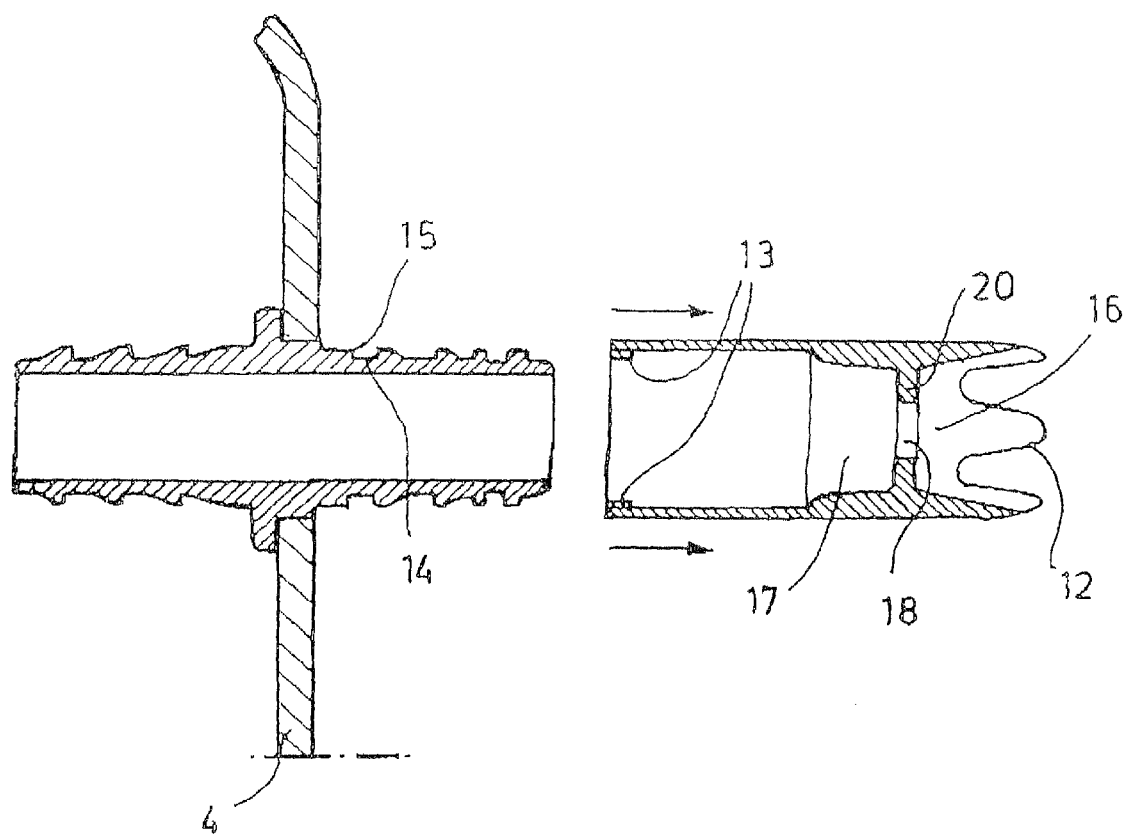
FIG. 3 diagrammatically shows the connection element remaining in the container wall as well as the procedure involved in removing the cutting element.

After manufacture of the article in the blow molding mold, the cutting element 11 can be removed from the outwardly projecting spigot 8 of the connection element 3, as is shown in FIG. 3.

In the above-described embodiment, the connection element 3 is of a symmetrical configuration in the form of a nipple or a double nipple, wherein provided on each side of the peripherally extending collar 6 is a respective spigot 8 having a Christmas tree profile 7, and the two spigots are of approximately the same length and the profiling 8 of the spigots is identical so that the cutting element 11 can be fitted onto each side of the connection element 3.

To form the melt material chambers 16, 17, the cutting element 11 is provided with an internal subdivision means 20 through which passes the melt material passage 18. Instead of a melt material passage 18, it is also possible to provide a plurality thereof.

Figure 4:
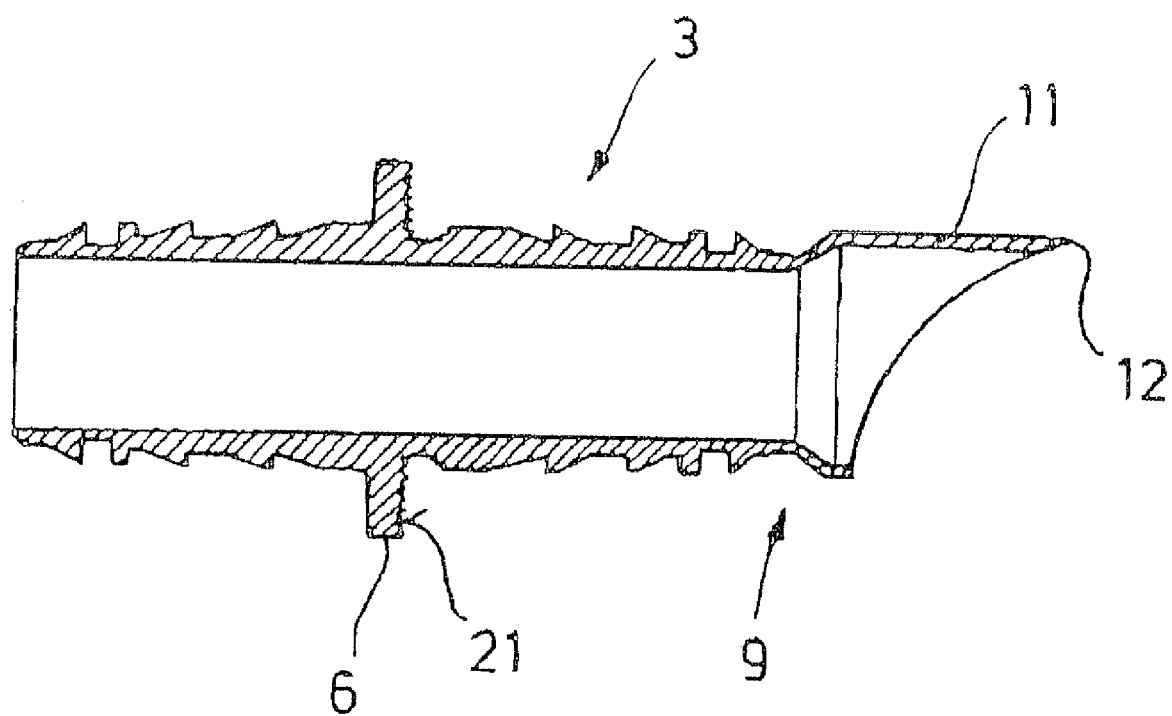
FIG. 4 shows a further variant of a connection element according to the invention.

In the variant of the connection element 3 shown in FIG. 4, it is provided at its leading end 9 with a cutting element 11 which is not in the form of a removable sleeve, but in the form of an integral constituent part of the connection element 3. The leading end 9 of the connection element is enlarged in a socket-like configuration and provided with a peripherally extending cutting edge 12 which is curved in the form of a circular arc in the sectional view shown in FIG. 4. That particular geometry of the cutting edge permits the wall of the container to be penetrated or stamped through, with a comparatively low level of penetration resistance, in order to prevent excessive protruding of the wall 4 of the container. If necessary, the cutting element can be cut off after manufacture of the container in a post-working step.

In order to improve the weldability of the collar 6 or the peripherally extending flange of the connection element 3 to the wall 4 of the container, the variant of the connection element 3 shown in FIG. 4 has a profiling, on the surface 21 of the collar 6, that is, towards the wall 4. The sawtooth-like structure of the surface 21 provides for a region-wise reduction in the thermal capacity of the plastic material so as to ensure easy weldability to the wall 4 of the container.

LIST OF REFERENCES 1 blow molding tool
2 component holder
3 connection element
4 wall
5 preform
6 collar
7 Christmas tree profile
8 spigot
9 leading end
10 rear end
11 cutting element
12 cutting edge
13 latching projections 14 latching recess
15 abutment
16 first melt material chamber
17 second melt material chamber
18 melt material passage
19 opening
20 subdivision means
21 surface

What is claimed is:

1. A process for the production of a container of thermoplastic material by extrusion blow molding, in which during shaping of the container within a multi-part tool the container is provided with at least one connection element which passes through the wall of the container, wherein the wall of the container is pierced in the still plasticised condition with a part of the connection element in such a way that the connection element provides a welded connection involving a flow of material with the container wall at least in partial regions, wherein the connection element is a two-part structure comprising a nipple with an insertion side and a hollow cutting element wherein said hollow cutting element is fitted removably on and surrounding said insertion side of said nipple, said hollow cutting element comprising a sleeve wherein said insertion side of said nipple upon penetration of the container wall is pushed into an opening which is provided in the wall of the blow molding tool and said insertion side of said nipple surrounded by said cutting element is not fused or covered with said thermoplastic material and wherein the diameter of the cutting element and the diameter of the opening are substantially the same.

2. The process as set forth in claim 1 characterized in that the connection element used is a nipple provided with a peripherally extending flange for welding to the container wall.

3. The process of claim 1 wherein said connection element is in the form of a tubular penetration element with a peripherally extending collar for welding to the container wall and that a part of the connection element is provided with a peripherally extending cutting edge.

4. The process of claim 3 characterized in that the peripherally extending cutting edge extends in a curve in a longitudinal central plane of the connection element.

5. The process of claim 4 characterized in that the connection element is of a two-part structure and the cutting element is of a sleeve-shaped configuration and encloses the insertion side of the connection element, the insertion side being provided for piercing the wall.

6. The process of claim 5 characterized in that the cutting element is latched to the connection element.

7. The process of claim 5 characterized in that the connection element is in the form of a nipple with at least one outer holding profile, wherein the holding profile co-operates in positively locking relationship with the cutting element.

8. The process of claim 4 characterized in that the cutting element is in the form of a substantially cylindrical sleeve with a peripherally extending cutting edge which leads in the position of installation.

9. The process of claim 8 characterized in that the cutting edge is of a wavy line-shaped configuration.

10. The process of claim 5 characterized in that in the longitudinal direction the cutting element has at least one subdivision means by which at least one melt material chamber, which are at the front or the rear in the cutting direction, is formed.

11. The process of claim 10 characterized in that two melt material chambers are formed that communicate with each other at least by way of a melt material passage.

12. The process of claim 1 characterized in that the connection element is integrally formed on a functional component.

* * * * *